June 2, 1970     L. U. C. KELLING     3,514,869

CONTOUR TRACING APPARATUS

Filed July 27, 1967     3 Sheets-Sheet 1

INVENTOR.
LEROY U. C. KELLING
BY *Michael Masnik*
HIS ATTORNEY

June 2, 1970 　　L. U. C. KELLING　　3,514,869
CONTOUR TRACING APPARATUS
Filed July 27, 1967　　　　　　　　　　3 Sheets-Sheet 2

INVENTOR.
LEROY U. C. KELLING
BY *Michael Masnik*
HIS ATTORNEY

June 2, 1970  L. U. C. KELLING  3,514,869
CONTOUR TRACING APPARATUS
Filed July 27, 1967  3 Sheets-Sheet 3

INVENTOR.
LEROY U. C. KELLING
BY Michael Masnik
HIS ATTORNEY

United States Patent Office 3,514,869
Patented June 2, 1970

3,514,869
CONTOUR TRACING APPARATUS
Leroy U. C. Kelling, Waynesboro, Va., assignor to General Electric Company, a corporation of New York
Filed July 27, 1967, Ser. No. 656,453
Int. Cl. G01b 7/28
U.S. Cl. 33—174                    18 Claims

ABSTRACT OF THE DISCLOSURE

An apparatus for tracing the three dimensional contours of a surface of a body. A non-contact type sensing probe is maintained a short distance from the surface and substantially perpendicular thereto as it translates over the surface. Translation and directional orientation of the probe are controlled from a manually operable control center and act through orienting and translating mechanisms. A plurality of resolvers are provided to resolve signals from the probe and control center so that the probe tip will automatically remain a given distance from the surface, the probe will translate as desired, and the movement of the probe will be converted into outputs indicative of the dimensions of the contour of the surface as it is being traced.

BACKGROUND OF THE INVENTION

In the past it has been very difficult to accurately trace the contour of three dimensional bodies, particularly in cases where abrupt changes in the contour occur and where the body material is such that the contour sensing probe must not touch the surface so as to prevent it from being marred. A particular example would be the tracing of an automobile body design of clay.

SUMMARY OF THE INVENTION

Accordingly, an object of the invention is to provide an apparatus which is able to quickly and accurately trace the contour of a three dimensional body without contacting the surface thereof.

To accomplish the above-mentioned object a contour tracing apparatus is provided which includes a sensing probe, an orienting mechanism which allows the longitudinal axis of the probe to be oriented in any desired direction, a translating mechanism which allows the sensor to be translated in any desired direction, a manually operable control center to control the translating and orienting mechanisms, resolving means which cause signals from the translating and orienting mechanisms to be broken down into three component signals, means communicating the signals to the translating apparatus, and an indication mechanism to provide an indication of the surface contour that is being traced.

The specification concludes with claims particularly pointing out and distinctly claiming the subject matter which I regard as my invention.

BRIEF DESCRIPTION OF THE DRAWINGS

Embodiments of my invention are described in detail in the following description taken in connection with the accompanying drawings in which.

DESCRIPTION OF THE PREFERRED EMBODIMENT

Figure 1:
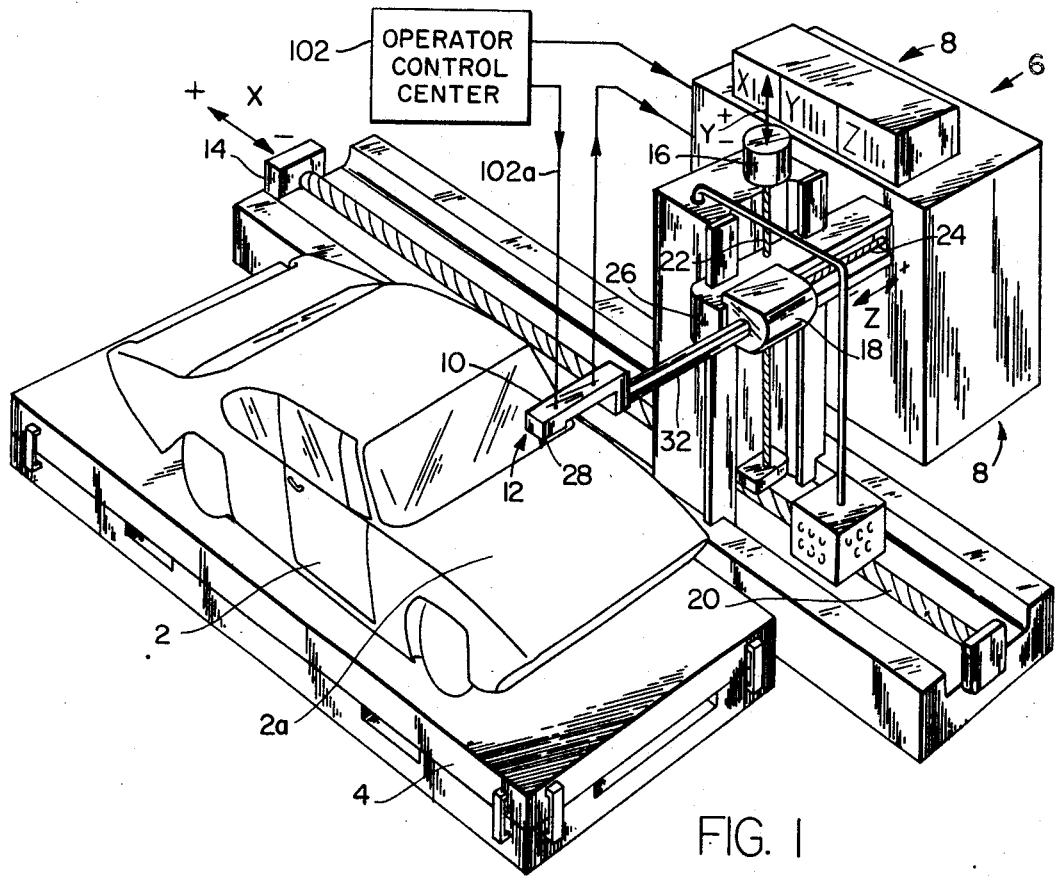
FIG. 1 is a perspective view of a contour tracing apparatus embodying the subject invention.

In FIG. 1, the operational portion of the contour tracing apparatus of the subject invention is shown. The object 2, such as a model, which is to be traced may be disposed on stationary pallet 4 adjacent the contour tracing apparatus 6. The tracing portion of the apparatus 6 is basically comprised of a translation mechanism 8, an orientation mechanism 10 and a sensor probe 12. The translation mechanism 8 includes three sets of motors 14, 16, 18 and screw-type translating means 20, 22, 24. Each set of motor and translating means respectively causes the probe 12 to translate in the X, Y, or Z direction as indicated by arrows. The translation mechanism 8 provides movement of the probe 12 in all three directions relative to the object 2 and the orientation mechanism 10 allows the longitudinal axis of the probe 12 to vary its angle of orientation without changing the position of the tip 28 of the probe 12 relative to the object 2, that is, at the point of intersection of the mutually perpendicular tilt and swivel axes to be described shortly.

As shown in FIG. 1, each translating means includes a screw which is rotatable by the respective motor. Each of the screws passes through a portion of the probe support structure 26 having mating screw threads so that rotation of one of the screws will cause translation of the probe support along the axis of rotation of that screw. It is obvious that many methods of causing translation may be used without departing from the scope of the subject invention. Also, as an alternative, the probe support may be fixed and the body to be traced may be translated in a desired direction by any type of translational mechanism, so that the probe will similarly translate with respect to the surface 2a of the object 2.

Figure 7:
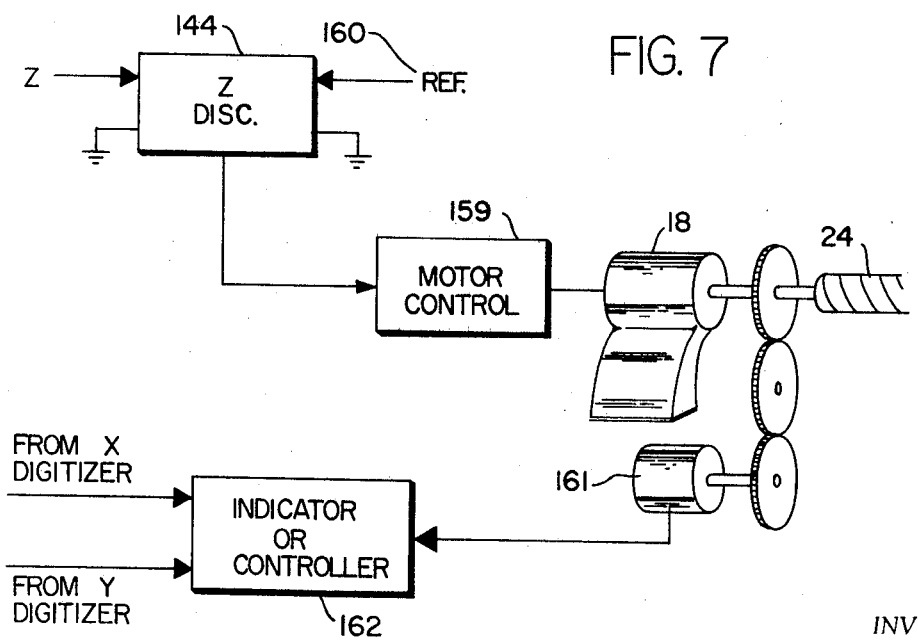
FIG. 7 is another portion of the circuit diagram showing an embodiment of a readout mechanism.

The orientation mechanism 10 is rigidly attached to a portion of the probe support 26. The probe 12 itself is an integral part of the orientation mechanism, as shown in FIGS. 2 and 7.

Figure 2:
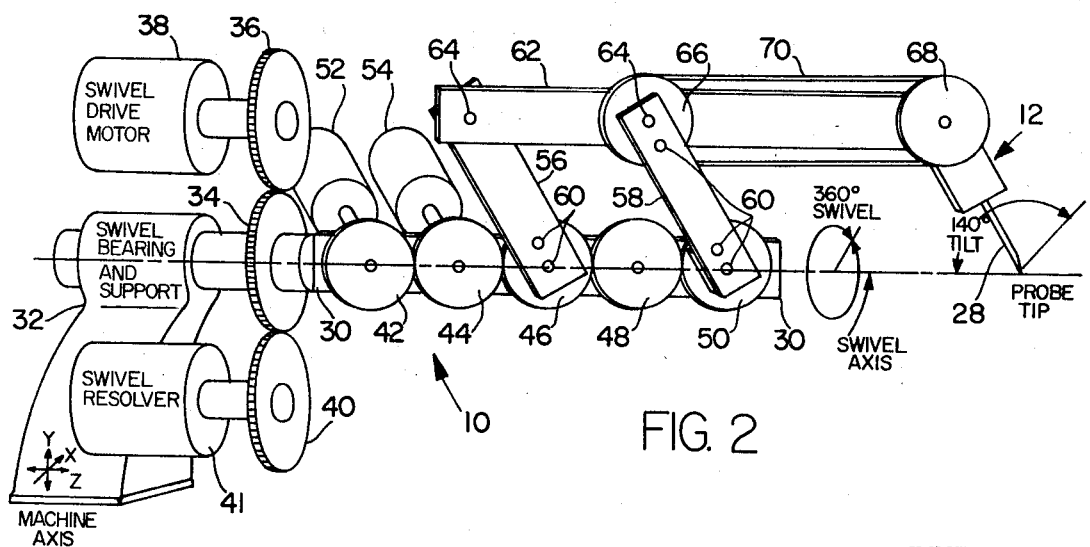
FIG. 2 is a perspective view of one embodiment of the orientation mechanism of the contour tracing apparatus.

In FIG. 2, a detailed view is shown of one embodiment of the orientation mechanism 10 which allows the angular orientation of the probe 12 to vary. The orientation mechanism 10 has means for effecting rotation of the probe 12 about the tip 28 of the probe in two orthogonal planes of rotation, the planes being referred to as swivel and tilt, so as to allow it to be oriented in substantially any direction. A horizontally extending support member 30 having a circular cross section at one end thereof is mounted in a swivel bearing and support 32 so as to be cantilevered therefrom and rotatable therein. Concentrically mounted on the support member 30 is a drive gear 34. The gear 34 is engaged on one side by a mating motor gear 36 which is driven by a swivel drive motor 38. Another portion of the gear 34 is engaged by a mating gear 40 which is connected to a swivel resolver 41 so as to cause rotation thereof indicative of the rotation of the support member 30.

A plurality of five similar, intermeshing gears 42, 44, 46, 48, 50 are rotatably mounted on the support member 30 such that their axes of rotation are all parallel to one another and are perpendicular to the axis of the shaft member 30. One of the gears 52 is connected to a tilt drive motor 52 so as to be rotatably driven thereby. A second gear 44 is connected to a tilt resolver 54. Each of two similar, parallel longitudinal members 56, 58 are rigidly connected at one end to one of the gears 46, 50, respectively. Connection may be effected by means such as a plurality of pins 60. One of the gears 48 is used as an idler gear between the third and fifth gears 46, 50. When the first gear 42 is rotated by the motor 52 the resolver 54 will be similarly rotated and the rotation will be transmitted to the two longitudinal members 56, 58 through the remaining gears. The other ends of the longitudinal members 56, 58 are rotatably connected to a horizontal member 62 by means such as a single pin 64. A pulley 66 is rotatably connected to member 62 at one end via one of the pins 64 and is also rigidly connected to one of the parallel longitudinal members 58 by means such as a pin 60 so that rotation of the gear 50 will be transmitted to the pulley 66. A similar pulley 68 is rotatably mounted at the other end of the horizontal member 62 and a metal strap 70 is disposed about and pinned to the two pulleys 66, 68 so that rotation of pulley 66 will cause similar rotation of pulley 68. The probe 12 is rigidly attached to the pulley 68 so that the probe axis is parallel to that of the longitudinal members 56, 58 and the tip 28 of the probe is on the axis of rotation of the support member 30. Therefore, rotation of the tilt drive motor gear 42 will cause similar rotation of the probe 12 which will be indicated by tilt resolver 54.

Using the configuration shown in FIG. 2, a full 360° swivel and 140° tilt of the probe 12 may be accomplished, thereby allowing the probe to approach the surface of the object at almost any desired angle. If it is desirable to be able to use any approach angle, modification may be made to the probe as described in copending application Ser. No. 656,449 filed July 7, 1967, now Pat. No. 3,501,943 issued Mar. 24, 1970 which is assigned to the same assignee as the subject application. Such modification may include providing a probe stylus having a bend therein and being rotatable about its axis.

Figure 3:
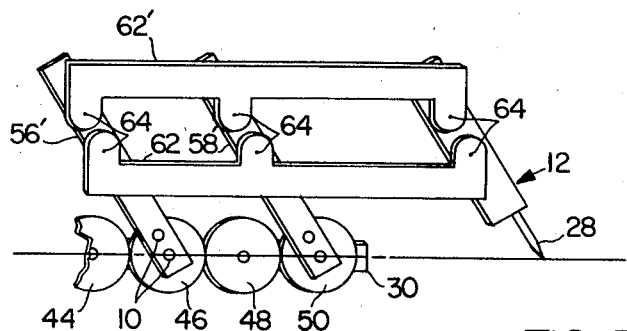
FIG. 3 is a perspective view of a portion of a second embodiment of the orientation mechanism.

A second embodiment of the tilt mechanism is shown in FIG. 3. The mechanism is somewhat similar to that shown in FIG. 2 in that it has the same gear train and similar parallel, longitudinal members 56', 58', which are respectively connected to gears 46 and 50. Horizontal member 62 is rotatably pinned to the longitudinal members 56', 58' approximately midway between the ends thereof. A second horizontal member 62' is pinned to the ends of the longitudinal members 56', 58' via pins 64. At the outer ends of the longitudinal members 62, 62' the probe 12, which may include an extension of its cover, is rotatably pinned via pins 64 to each horizontal member 62, 62' so that the axis of the probe is parallel to the axis of the longitudinal members 56', 58' and the probe tip 28 rides along the axis of the support member 30.

Both embodiments of the orientation mechanism 10, as shown in FIGS. 2 and 3, allow a high degree of flexibility of orientation of the probe so that it may be positioned near to and substantially perpendicular to a surface of practically any contour no matter how abrupt or complex it may be. Such flexibility is one of the important features of the subject invention that allows the contour tracing apparatus to give an accurate representation of the surface contour of a three dimensional object.

It is obvious that there are many other possible embodiments of the orienting mechanism, such as substitution of belt and pulley or chain and sprocket for the gear drive, or mere rearrangement of the motors or resolvers which do not depart from the scope of the invention.

Figure 4:
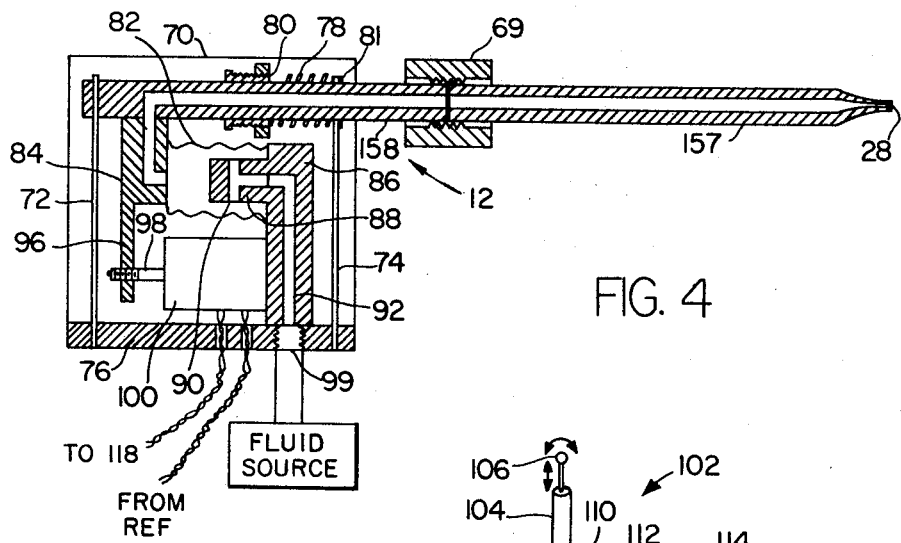
FIG. 4 is a cross sectional view of an embodiment of a pneumatic sensor probe.

In FIG. 4, a cross sectional view of an electro-pneumatic probe is shown which may be used as the probe 12 of the contour tracing apparatus. The probe tip 28 is located at the end of a hollow stylus 157. The stylus 157 is connected to a hollow deflection rod 158 by means such as a connector 69 having a threaded passageway therethrough. The deflection rod 158 passes through the cover 70 of the probe and is substantially supported by two parallel leaf springs 72, 74. The springs 72, 74 are supported at one end by a base 76 located at the bottom of the probe, and each extend upward on opposite sides of the probe. An adjustable compression spring 78 is located concentrically about a portion of the rod 158 and is supported at one end by an adjustable clip 80 and at the other end by a support member 81 which is connected to the rod 158 and the leaf spring 72. The hollow passageway within the connecting rod 158 communicates with the interior of a bellows 82 through one end thereof via a passageway in a bellows support member 84. The bellows is fixed at the other end to a stationary support 86. A filler 88 is disposed within the interior of the bellows and has a plurality of radial passages 90 therein which serve to communicate the interior of the bellows with a passageway 92 in the stationary support 86. The passageway 92 terminates at the base and is provided with a means 99 for connection to a constant pressure air supply. Connected to the bellows support member 84 is a core support portion 96 which is in turn connected to a core 98 of a transducer 100. Therefore, movement of the free end of the bellows 82 causes a proportional movement of the core 98 in the transducer 100. In one embodiment, transducer 100 comprises a transformer arrangement having an output winding 116 energized from a reference signal REF available from 124 of FIG. 6.

It is desirable that the probe be adjusted so that when there is a predetermined desired clearance (for example, .006″) between the probe tip 28 and the surface 2a, the output signal from the transducer is zero. Such adjustment can be readily made by adjusting the compression on the compression spring 78 by means of the clip 80 and/or by adjustment of the core 98 in the transducer 100. The adjustment can also be effected by adding or changing a restricting orifice or changing the pressure of the input air supply.

In operation, the stylus 66 moves up and down with respect to the housing 70 while essentially maintaining a constant air gap with respect to the surface to be traced. As the probe tip 28 approaches the surface 2a, the internal air pressure will increase within the stylus 157. This increased pressure acting within the bellows 82 will cause the bellows to expand and both the stylus 157 and the core 98 of the transducer 100 to move with respect to the housing 70. This action will result in an electrical signal from the transducer proportional to the probe tip clearance relative to the predetermined clearance. The pneumatic portion of this device is a much higher gain unit so that the change in air gap with respect to the traced surface is small for a large travel of the transducer core with respect to the probe housing. Thus, a wide modulating region is produced so that high speed servo control systems can be operated with good dynamic performance and lower gains. Also, the response of the pneumatic follower is sufficiently fast that phase shift and the delays in the positioning of the probe tip 28 with respect to the surface 2a will introduce only small and permissible amounts of position and phase lag in the electrical output signal from the electrical transducer.

The pneumatic sensing probe, described above, thus permits a wide linear modulating zone for the sensing tip along with accurate control up to normally the highest required tracing speeds. Therefore, for a clearance of .006″ the tracing speed may be well in excess of 30 inches per minute.

Although, in the preferred embodiment of the subject invention an electro-pneumatic probe of the type described above is used, it is contemplated that other variations of an electro-pneumatic probe or other types of non-contact probes, such as capacitance or inductance probes, may also be used.

Figure 5:
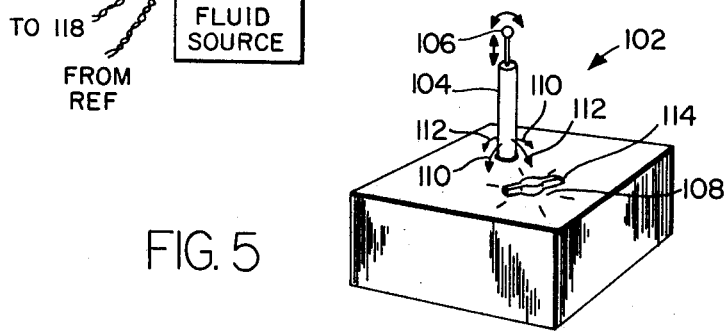
FIG. 5 is a perspective view of the operator control center.

In FIG. 5, the operator's control center 102 is shown. The control center 102 consists of a joy stick 104, a knob 106 mounted on top of the joy stick, and a steering direction resolver 108. Movement of the joy stick 104, itself, controls the orientation mechanism 10 of the tracing apparatus. Tipping the joy stick fore and aft, as shown by arrows 110 causes the tilt drive mechanism to be actuated in one direction or the other. Similarly, tipping of the joy stick 104 to either side, as shown by arrows 112 causes the swivel motors to be actuated in one direction or the other. Pushing the knob 106 in or pulling it out causes the probe 12 to be fed in or fed out, respectively, in a direction along the axis of the stylus 157. Thus the probe tip is oriented by the operator using the control mechanism of FIG. 5 coupled with visual observation. Normally the operator tends to keep the probe tip nearly perpendicular to the working surface such that the back pressure developed by the probe is used (as shown in FIG. 4) to automatically halt movement of the probe toward the model surface. The operator by moving 106 up or down can back off, or advance the probe toward the model surface until the back pressure halts further movement. Twisting of the knob 106 controls the speed with which the tracing probe moves over the surface to be traced in a plane perpendicular to the axis of the stylus 157. Positioning of a knob 114, which is connected to the steering resolver 108, determines the direction in which the probe 12 will move in the plane. Of course, control might alternatively be effected by means such as rotatable knobs instead of a joy stick.

Figure 6:
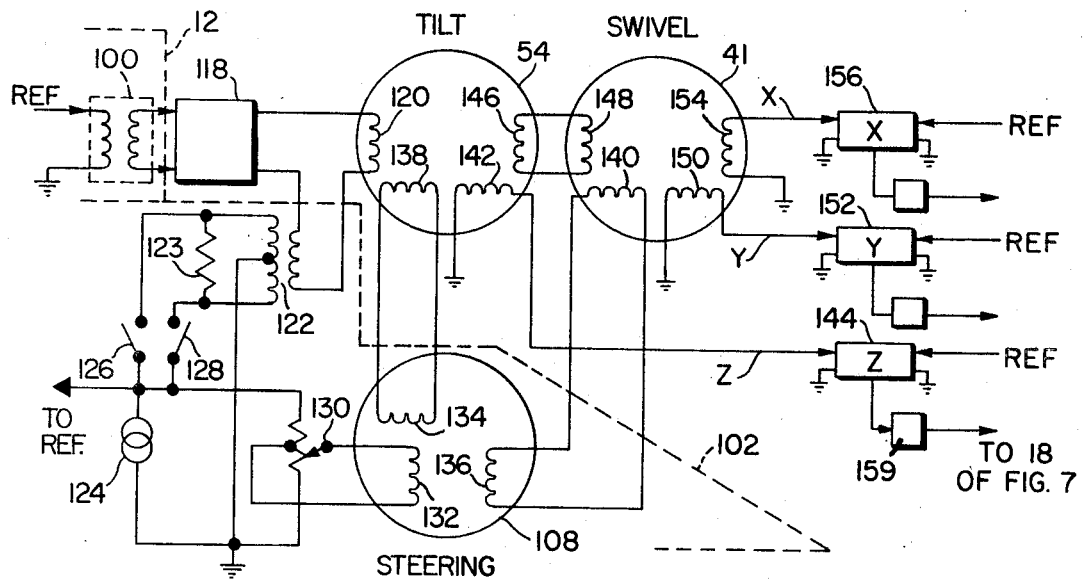
FIG. 6 is a portion of the circuit diagram for the tracing apparatus.

In FIG. 6, a circuit diagram of the basic control circuitry is shown. Control of the tilt and swivel motors 52, 38 as initiated by the movement of the joy stick 104 is merely a simple direct motor control and is separate from the central control circuitry shown in FIG. 6. The DC motor control signals from 102 in FIG. 1 are applied over 102a to orientation mechanism 10 which contains the tilt and swivel motors and associated components shown in FIG. 2.

In each of the resolvers the output windings as a set are rotatable relative to the input windings as a set. The two output windings as well as the two input windings are fixed perpendicular to each other. It is irrelevant for the purposes of explanation which set of windings is fixed and which is rotatable. However, for present purposes the input windings will be considered rotatable.

An output winding 116 of the transducer 100 (shown in FIG. 4) is connected to a signal amplifier 118 which in turn is connected to a primary input winding 120 of the tilt resolver 54. A secondary winding of a feed transformer 122 is in series with the input winding 120 and the output of the amplifier 118. A resistor 123 is provided across the primary winding of the transformer 122 so that when there is no signal through the primary winding, the secondary winding will have virtually no impedance. An AC excitation source 124 is provided and may be connected to the winding of the transformer 122 via either one of two switches 126, 128. The switches 126, 128 are controlled by pushing the knob 106 of the control center in or out. The effect of closing one switch instead of another switch is merely to reverse the phase in the transformer. In parallel with the excitation source 124 is a speed potentiometer 130 which is controlled by twisting the knob 106. The output from the speed potentiometer 130 is fed to an input winding 132 of the steering resolver 108. Output windings 134, 136 of the steering resolver 108 are respectively fed to windings 138, 140 of the tilt and swivel resolvers 54, 41. One of the output windings 142 of the tilt resolver 54 is connected to a discriminator 144 for the Z component. The second output winding 146 of the tilt resolver 54 is connected to an input winding 148 of the swivel resolver 41. An output winding 150 of the swivel resolver is connected to a discriminator 152 of the Y component. A second output winding 154 of the swivel resolver is fed directly to a third discriminator 156 for the X component. The discriminators 144, 152, 156 are then fed to motor control units, as described below in detail in regard to FIG. 7.

To understand the operation of the control circuit it must be realized that only two signals can be initiated from the control center to the basic control circuit. One signal, a feed signal, may be initiated at the control center by either pushing or pulling the knob 106. This feed signal acts so as to cause the probe to move in or out along the probe axis and is used as a coarse adjustment to initially set the probe tip near the surface, to cause the probe to follow abrupt major changes in surface contour, and to finally move the probe away from the surface when the tracing is completed. It is only used to place the probe tip into or out of a position where the probe signal, which also causes probe movement only on the probe axis, can take over to automatically maintain the desired probe clearance. The second signal initiated from the control center is a translation speed signal which is to determine the speed at which the probe translates in a plane perpendicular to the probe axis.

By having the input windings tilt and swivel resolvers 54 and 41 rotatable respectively with the probe, the signals incoming thereto are resolved into their X, Y and Z components as if they were acting along or perpendicular to the probe axis as indicated by the angular position of the input windings (i.e., the probe axis) depending on which of the two perpendicular input windings the signal is fed to. In a similar manner, the direction which the operator wishes the probe to translate (in the plane perpendicular to the probe axis) is set by rotation of the input windings of the steering resolver by rotation of the appropriate knob. This is all explained in greater detail below with respect to a specific operating sequence.

In operation, if the clearance between the probe tip 28 and the surface 2a of the object differs from the predetermined clearance, as explained above, a probe signal is initiated in the winding 116. This signal is amplified via the amplifier 118 and a second feed signal from the feed transformer 122 is serially added or subtracted to the amplified probe signal via the feed transformer 122 if a feed signal is initiated in the control center. The resultant signal is then fed into the tilt resolver 54 via input winding 120.

The tilt resolver, due to the angular position of its input windings, causes a signal through the input winding 120 to be broken down into a Z axis via output winding 142 and a radial (X–Y) component signal via output winding 146 as if the input signal were acting in a tilt plane along the probe axis. Similarly, a signal to input winding 138 which is perpendicular to winding 120 is resolved into its Z axis and radial component signals via the same output windings 142, 146 as if it were acting in a tilt plane perpendicular to the probe axis.

The resolved Z axis signal is fed out through winding 142 to the Z discriminator 144 and a radial signal from winding 146 is fed into the swivel resolver 41 via winding 148. The swivel resolver, due to the angular position of its input windings, causes a signal through the input winding 148 to be broken down into X and Y axis component signals via output windings 154 and 150, respectively, as if the signal were acting in a swivel plane along the probe axis. Similarly, a signal to input winding 140 is perpendicular to input winding 148 is resolved into X and Y axis signals via the same output windings 154, 150 as if it were acting in a tilt plane perpendicular to the probe axis. The axis signal goes from winding 154 to the X discriminator 156 and the Y axis signal goes from the winding 150 to the Y discriminator 152.

A tracing translational speed signal from the AC excitation source 124 acting through the speed potentiometer 130 is fed to the steering resolver via input winding 132. The steering resolver, due to the angular position of its input winding (as set from the control center) causes the signal through the input winding 132 to be broken down into a component signal acting in the Z-radial (tilt) plane and a component signal acting in the X–Y (swivel) plane. Since the speed signal is desired to act in a plane perpendicular to the probe axis (so that the probe will be caused to translate in that plane) the component signals are respectively fed to the appropriate tilt input winding 138 and swivel input winding 140 so that they will be eventually resolved into their X, Y and Z components, as explained above.

Thus, probe, feed, and translation signals are concurrently resolved into their X, Y and Z component signals while the respective component signals are added together and the resultant component signals are fed to the respective discriminators.

The outputs of each of the discriminators 144, 152, 156 are then used to control the respective translation motors 18, 16, 14 so as to cause the cumulative desired movement of the probe due to the control center and probe signals and also provide a readout.

An example of the circuitry which may be used to accomplish this is shown in FIG. 7. Although only circuitry for the Z axis discriminator is shown, it is understood that similar circuitry is provided for each of the discriminators. Each discriminator is what is commonly referred to as an amplitude discriminator. Therefore, the AC input from a resolver is changed to a DC output whose amplitude is proportional to the amplitude of the AC input. The AC reference signal 146 to each discriminator is used as a phase comparator with the AC input from the resolver so that the polarity of the DC output will be determined by whether the input from the resolver is in or out of phase with the input from the reference. In this way, each AC signal from a resolver is changed into a DC signal indicative of the magnitude and direction the probe is desired to be translated along each component axis as indicated by the signals initiated from the control center and probe. The DC output from each discriminator, such as 144, is fed to a respective motor control unit 149. The motor control unit causes rotation of the respective translation motor 18 proportional to the amplitude of the DC signal and in the direction indicated by the polarity of the DC signal. This motor rotation causes a proportional translation of the probe via the screw mechanism. Therefore, the probe is caused to be translated in the direction and proportional to the magnitude of the signals from the control center and probe.

One possible way of providing a readout indicative of the contour is to have a shaft digitizer 161 connected to to the shaft of the motor 18 or the screw 24 by means such as gear or pulleys. The readout from all three axes supplied to indicator 162 will then give the coordinates of the point being traced at any given instant. Each of the readouts may be simultaneously and continuously recorded and/or displayed in indicator 162. Also, the readouts may be combined so as to give a single three-dimensional plot or plurality of two-dimensional plots. As an alternative, the readout signals may each be amplified or attenuated the same amount or remain unchanged and fed into a controller 162 such as a numerical control system for controlling the machining of an object to a similar contour as that of the subject 2 which is being traced.

The subject invention thus discloses a contour tracing apparatus in which a non-contact type probe may be positioned by an operator so as to translate over a three-dimensional object while automatically maintaining a predetermined clearance between the probe tip and the surface of the object no matter how complicated the contour of the object so as to provide a readout indicative of the contour of the object traced by the probe. Therefore, a contour along any cross section of a three dimensioned object may quickly and easily be obtained without distruction or harm of the model. Flexibility of the system in providing manual control over the angular orientation and direction and speed of translation of the probe in three dimensions along with the automatic clearance control with a non-contact type probe are important features which allow the subject invention to easily, quickly and accurately trace practically any contour in two or three dimensions. Also the simplicity of the basic control circuit provides economic as well as operational advantages over other methods of contour tracing.

It will be aparent to those skilled in the art that many modifications to the embodiments of my invention may be made within the true spirit and scope of my invention.

What I claim as new and desire to secure by Letters Patent of the United States is:

1. A tracing apparatus for tracing the contours of a three dimensional surface of an object comprising:
   (a) a probe having a probe axis comprising an elongated stylus member having a probe tip at one end and means for producing an electrical signal indicative of the distance between said probe tip and the surface of said object;
   (b) orientation means connected means connected to said probe for angularly orienting the probe axis of said stylus member relative to the surface of said object;
   (c) three dimensional translating means for translating said probe relative to the surface of said object;
   (d) manual control means connected to said orientation and said translating means for providing continuous manual control over the orientation and translation of said probe relative to the surface of said object;
   (e) a plurality of resolver, each including input means and output means, said manual control means and said probe being electrically connected to said input means of said resolvers;
   (f) connecting means between said output means of said resolvers and said translating means for transmitting signals in a usable form to said translating means; and
   (g) indication means connected to said translating means for indicating the position of said probe tip.

2. A tracing apparatus as in claim 1 wherein:
   (a) said orientation means includes a tilt motor and a swivel motor, each connected to said probe to cause rotation of the probe axis about said probe tip so that actuation of said motors causes a change in angular orientation of the probe axis of said stylus member while said probe tip remains relatively fixed.

3. A tracing apparatus as in claim 2 wherein:
   (a) two of said resolvers are respectively rotatable by said tilt and swivel motors to resolve resolver input signals in the tilt and swivel planes, respectively, into coordinate component output signals; and
   (b) a third resolver is part of said control means and is manually rotatable so as to control the direction of translation of said probe relative to the surface of said object.

4. A tracing mechanism as in claim 1 wherein said translating means includes three motors and drive means mounted so as to be manually perpendicular to each other of said motor and drive means so as to be able to cause translation of said probe in three orthogonal directions.

5. A tracing apparatus as in claim 1 wherein said probe is of a fluid pressure type and said stylus member includes a passageway extending therethrough so that a fluid may flow through said passageway out toward the surface of said objects; and said means for producing an electrical signal senses the pressure of the fluid in said passageway to give an indication of the distance between said probe tip and the surface of said object.

6. A tracing apparatus as in claim 5 wherein the fluid is a gas.

7. A tracing apparatus as in claim 1 wherein said manual control means includes means for controlling movement of said probe along the probe axis into or away from the surface of said object; means for controlling the speed of translation of said probe substantially parallel to the surface of said object adjacent said probe; one of said resolvers having a manually rotatable portion to control the direction of translation of said probe in a plane substantially parallel to the surface of said object adjacent said probe; and means for controlling said orientation means.

8. A tracing apparatus as in claim 4 wherein:
   (a) said orientation means includes a tilt motor and a swivel motor, each connected to said probe to cause rotation of the probe axis about said probe tip so that actuation of said motors causes a change in angular orientation of the probe axis of said stylus member while said probe tip remains relatively fixed;

(b) two of said resolvers are respectively rotatable by said tilt and swivel motors to resolve resolver input signals in the swivel and tilt planes, respectively, into coordinate component output signals;

(c) said probe is of a fluid pressure type and said stylus member includes a passageway extending therethrough so that a fluid may flow through said passageway out toward the surface of said object, and said means for producing an electrical signal senses the pressure of the fluid in said passageway to give an indication of the distance between said probe tip and the surface of said object;

(d) said manual control means includes means for controlling movement of said probe along the probe axis into or away from the surface of said object; means for controlling the speed of translation of the probe substantially parallel to the surface of said object adjacent said probe; a third resolver having a manually rotatable portion to control the direction of translation of said probe in a plane substantially parallel to the surface of said object adjacent said probe; and means for controlling said orientation means;

(e) said connecting means between said output means includes three discriminators; and (f) said translating means includes motor control units electrically connected between said discriminators and said motor and drive means for controlling the actuation of the respective motor and drive means so as to control the translation of said probe.

9. A method for tracing the contour of a three dimensional surface of an object comprising the following steps:

(a) positioning a probe having a probe axis near the surface to be traced and orienting the probe axis substantially perpendicular to the surface;

(b) manually adjusting the rate and direction of translation of the probe over the surface and producing a translation signal, (c) adjusting the movement of the probe toward or away from the surface along the probe axis by producing a feed signal, (d) adjusting the angular orientation of the probe relative to the surface by rotating the probe body about a first axis and rotating said probe body about a second axis perpendicular to and intersecting the first axis, (e) sensing the clearance between a sensing tip of the probe and the surface and producing a clearance signal, (f) adding the clearance signal to the feed signal to get a first resultant signal;

(g) resolving the first resultant signal and the translation signal into three mutually orthogonal component signals; and (h) using the component signals to automatically maintain the sensing tip at a given clearance from the surface at all times and to provide an indication of the contour of the surface.

10. A tracing method as in claim 9 wherein the step of sensing the clearance is accomplished by causing a fluid to flow from the probe onto the surface and sensing the pressure of the fluid.

11. A method for tracing the contour of a three dimensional surface of an object comprising the following steps:

(a) positioning a probe having a probe axis near the surface to be traced and orienting the probe axis substantially perpendicular to the surface;

(b) manually adjusting the rate and direction of translation of the probe over the surface and producing a translation signal, (c) adjusting the movement of the probe toward or away from the surface along the probe axis and producing a feed signal, (d) adjusting the angular orientation of the probe relative to the surface by rotating the probe body about a first axis and rotating said probe body about a second axis perpendicular to and intersecting the first axis, (e) sensing the clearance between a sensing tip of the probe and the surface and producing a clearance signal;

(f) adding the clearance signal to the feed signal to get a first resultant signal;

(g) resolving the first resultant signal and the translation signal into a first component acting along a first axis and a further component acting in a plane perpendicular to said first axis, resolving said further component into a second and third component, said first, second and third components being mutually orthogonal to one another;

(h) using the first, second and third component signals to automatically maintain the sensing tip at a given clearance from the surface at all times and to provide an indication of the contour of the surface.

12. The method of claim 11 wherein said first axis is parallel to one of said mutually orthogonal axes.

13. In combination means for tracing the contours of a three dimensional surface of an object comprising:

(a) a probe having a probe axis and a probe tip at one end;

(b) means for angularly orienting the probe axis of said stylus member relative to the surface of said object;

(c) means for translating said probe relative to the surface of said object;

(d) means for adjusting the orientation and translation of said probe relative to the surface of said object;

(e) control means comprising input means and output means, said adjusting means and said probe being coupled to said input means;

(f) and said output means being coupled to said translating means.

14. A method for tracing the contour of a three dimensional surface of an object comprising the following steps:

(a) positioning a probe having a probe axis near the surface to be traced and orienting the probe axis substantially perpendicular to the surface;

(b) adjusting the rate and direction of translation of the probe over the surface and producing a translation signal, (c) adjusting the movement of the probe toward or away from the surface along the probe axis and producing a feed signal, (d) adjusting the angular orientation of the probe relative to the surface;

(e) sensing the clearance between a sensing tip of the probe and the surface and producing a clearance signal thereof;

(f) adding the clearance signal to the feed indication to get a first resultant signal;

(g) resolving the first resultant signal and the translation signal into three mutually orthogonal component signals; and (h) maintaining the sensing tip at a given clearance from the surface in response to said component signals.

15. A method according to claim 14 further comprising providing an indication of the contour of the surface in response to said component indications.

16. A tracing method as in claim 14 wherein the step of sensing the clearance is accomplished by causing a fluid to flow from the probe onto the surface and sensing the pressure of the fluid.

17. A method for tracing the contour of a three dimensional surface of an object comprising the following steps:

(a) positioning a probe having a probe axis near the surface to be traced and orienting the probe axis substantially perpendicular to the surface;

(b) adjusting the rate and direction of translation of the probe over the surface and producing a translation signal;

(c) adjusting the movement of the probe toward or away from the surface along the probe axis and producing a feed signal, (d) adjusting the angular orientation of the probe relative to the surface;

(e) sensing the clearance between a sensing tip of the probe and the surface and producing a clearance signal thereof;

(f) adding the clearance signal to the feed signal to get a first resultant signal;

(g) resolving the first resultant signal and the translation signal in accordance with the angle of tilt of said probe into a first component signal acting along a swivel axis and a further component signal acting in a plane perpendicular to said swivel axis, resolving said further component signals in accordance with a swivel angle into second and third component signals, said first, second and third component signals being mutually orthogonal to one another, and (h) maintaining the sensing tip at a given clearance from the surface in response to said component signals.

18. A tracing apparatus as in claim 1 wherein said orientation means comprises means for angularly orienting the probe axis of said stylus member about mutually perpendicular tilt and swivel axes while effectively maintaining the probe tip at the point of intersection of said axes.

References Cited
UNITED STATES PATENTS 3,192,628    7/1965    Wroble _____ 33—174
3,032,881    5/1962    Fengler _____ 33—23

SAMUEL S. MATTHEWS, Primary Examiner